(12) United States Patent
Kim et al.

(10) Patent No.: US 9,141,854 B2
(45) Date of Patent: Sep. 22, 2015

(54) METHOD AND APPARATUS FOR GENERATING STRUCTURE OF TABLE INCLUDED IN IMAGE

(71) Applicants: Samsung Electronics Co., Ltd., Suwon-si, Gyeonggi-do (KR); Seoul National University R&DB Foundation, Seoul (KR)

(72) Inventors: Sang-ho Kim, Hwaseong-si (KR); Nam-ik Cho, Seoul (KR); Mu-sik Kwon, Seoul (KR); Beom-su Kim, Seoul (KR); Won-kyo Seo, Seoul (KR)

(73) Assignees: Samsung Electronics Co., Ltd., Suwon-si (KR); Seoul National University R&DB Foundation, Seoul (KR)

( * ) Notice: Subject to any disclaimer, the term of this patent is extended or adjusted under 35 U.S.C. 154(b) by 0 days.

(21) Appl. No.: 14/477,151

(22) Filed: Sep. 4, 2014

(65) Prior Publication Data

US 2015/0071500 A1    Mar. 12, 2015

(30) Foreign Application Priority Data

Sep. 6, 2013   (KR) ........................ 10-2013-0107508

(51) Int. Cl.
*G06K 9/00* (2006.01)
*G06K 9/46* (2006.01)
*G06T 5/00* (2006.01)

(52) U.S. Cl.
CPC ........ *G06K 9/00449* (2013.01); *G06K 9/00463* (2013.01); *G06K 9/4638* (2013.01); *G06T 5/002* (2013.01); *G06T 2207/10008* (2013.01); *G06T 2207/20182* (2013.01); *G06T 2207/30176* (2013.01)

(58) Field of Classification Search
USPC ......... 382/181, 203, 193, 178, 310, 275, 252, 382/159, 176; 345/671, 682; 250/310; 358/3.03, 450, 452, 536
See application file for complete search history.

(56) References Cited

U.S. PATENT DOCUMENTS

| | | | |
|---|---|---|---|
| 5,889,887 A | * | 3/1999 | Yabuki et al. ................. 382/178 |
| 6,052,480 A | * | 4/2000 | Yabuki et al. ................. 382/178 |
| 2009/0245645 A1 | | 10/2009 | Xing |
| 2010/0192178 A1 | | 7/2010 | Candelore |
| 2010/0208282 A1 | | 8/2010 | Isaev |
| 2010/0246958 A1 | | 9/2010 | Ma |
| 2012/0269435 A1 | | 10/2012 | Xiao |
| 2012/0314954 A1 | | 12/2012 | Moore et al. |

FOREIGN PATENT DOCUMENTS

| | | |
|---|---|---|
| KR | 10-0259804 B1 | 3/2000 |
| KR | 10-2000-0025937 A | 5/2000 |
| KR | 10-2010-0135281 A | 12/2010 |

* cited by examiner

*Primary Examiner* — Anh Do
(74) *Attorney, Agent, or Firm* — Jefferson IP Law, LLP (57) ABSTRACT

A method of recognizing and generating a structure of a table included in an image is provided. The method includes extracting lines forming the table from among connection components forming an image, determining line intersections by using crossing functions matched with the lines, determining one of a plurality of crossing models identified based on a plurality of crossing shapes, in correspondence with each of the line intersections, and generating data about the table, which includes at least one cell determined using the determined crossing model.

20 Claims, 9 Drawing Sheets

| CROSSING MODEL 1 | CROSSING MODEL 2 | CROSSING MODEL 3 | CROSSING MODEL 4 | CROSSING MODEL 5 | CROSSING MODEL 6 |
|---|---|---|---|---|---|
| ⊢ | ⊤ | ⊣ | + | ⊢ | ⊤ |

| CROSSING MODEL 7 | CROSSING MODEL 8 | CROSSING MODEL 9 | CROSSING MODEL 10 | CROSSING MODEL 11 | CROSSING MODEL 12 |
|---|---|---|---|---|---|
| ⊥ | ⊢ | ⊣ | ⊣ | + | • |

METHOD AND APPARATUS FOR GENERATING STRUCTURE OF TABLE INCLUDED IN IMAGE

CROSS-REFERENCE TO RELATED APPLICATION(S)

This application claims the benefit under 35 U.S.C. §119(a) of a Korean patent application filed on Sep. 6, 2013, in the Korean Intellectual Property Office and assigned Serial number 10-2013-0107508, the entire disclosure of which is hereby incorporated by reference.

TECHNICAL FIELD

The present disclosure relates to a method and apparatus for generating a structure of a table included in an image. More particularly, the present disclosure relates to a method and apparatus for recognizing and generating a structure in a geometrically distorted image.

BACKGROUND

In general, related methods of analyzing a structure of a table in an image rely upon spaces between words in the table, a grid of lines forming the table, or the like. Such a method is suitable for a document image acquired by a flat scanner or a document image, such as a PDF file, having hardly any geometric distortion.

However, according to the above-described methods, when a structure of a table is in an image having a geometric distortion, such as an image acquired by a camera, the structure cannot be accurately analyzed.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and apparatus for generating a structure of a table in an input image having geometric distortion.

Additional aspects will be set forth in part in the description which follows and, in part, will be apparent from the description, or may be learned by practice of the presented embodiments.

In accordance with an aspect of the present disclosure, a method of recognizing and generating a structure of a table included in an image is provided. The method includes extracting a plurality of lines forming the table from among a plurality of connection components forming the image, determining a plurality of line intersections by using a plurality of crossing functions each corresponding to a line intersection, determining one of a plurality of crossing models identified based on a plurality of crossing shapes, in correspondence with each of the plurality of line intersections, and generating data describing the table, which includes at least one cell determined using the determined crossing models.

In accordance with another aspect of the present disclosure, an apparatus for recognizing and generating a structure of a table included in an image is provided. The apparatus includes a function determination unit configured to extract a plurality of lines forming the table from among a plurality of connection components forming the image and determining a plurality of crossing functions each corresponding to one of the plurality of lines, a cell generation unit configured to determine a plurality of line intersections by using the plurality of crossing functions, to determine one of a plurality of pre-stored crossing models identified based on crossing shapes, and to generate data describing the table, which includes at least one cell determined using the determined crossing model, and a table storage unit configured to store the crossing shapes.

In accordance with another aspect of the present disclosure, a non-transitory computer-readable storage medium has stored therein program instructions, which when executed by a computer, perform the method of recognizing and generating a structure of a table is provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although general terms as currently widely used as possible are selected as the terms used in the present disclosure while taking functions in the present disclosure into account, they may vary according to an intention of those of ordinary skill in the art, judicial precedents, or the appearance of new technology. In addition, in specific cases, terms intentionally selected by the applicant may be used, and in this case, the meaning of the terms will be disclosed in a corresponding description of the disclosure. Accordingly, the terms used in the present disclosure should be defined not by simple names of the terms but by the meaning of the terms and the contents over the present disclosure.

In the specification, when a certain part "includes" a certain component, this indicates that the part may further include another component instead of excluding another component unless there is different disclosure. In addition, the term, such as " . . . unit" or "module", disclosed in the specification indicates a unit for processing at least one function or operation, and this may be implemented by hardware, software, or a combination thereof.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 1:
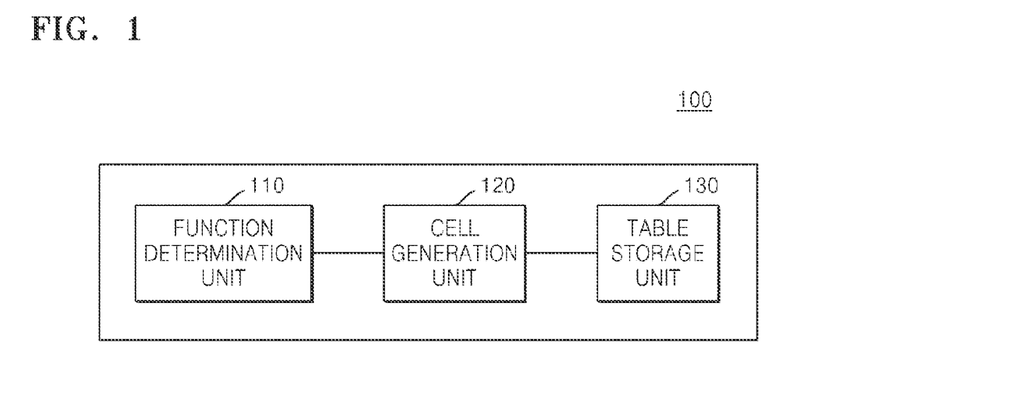
FIG. 1 is a block diagram of a table structure generation apparatus according to an embodiment of the present disclosure.
Figure 2:
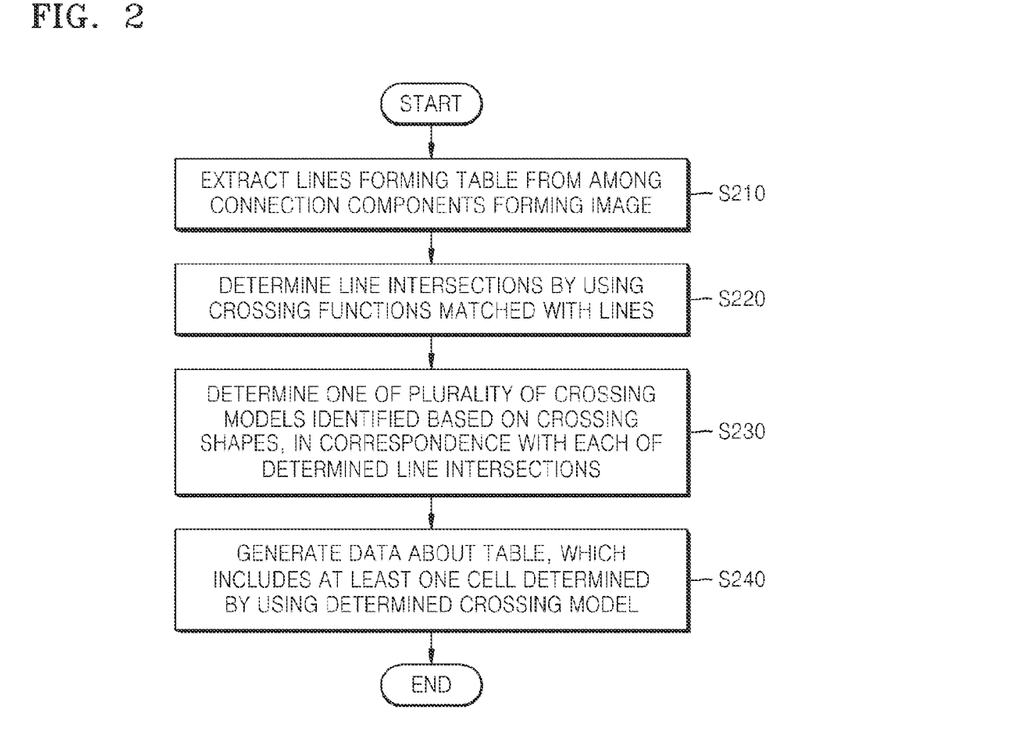
FIG. 2 is a flowchart of a table structure generation method according to an embodiment of the present disclosure.

FIG. 1 is a block diagram of a table structure generation apparatus 100 according to an embodiment of the present disclosure. FIG. 2 is a flowchart of a table structure generation method according to an embodiment of the present disclosure.

The table structure generation apparatus 100 according to various embodiments of the present disclosure may extract lines forming a table included in an image. In addition, the table structure generation apparatus 100 may determine functions matched with the extracted lines of the table and determine line intersections forming the table by using crossing functions. In addition, the table structure generation apparatus 100 may determine crossing models corresponding to the line intersections and generate data describing the table including at least one cell by using the determined crossing models.

The table structure generation apparatus 100 according to various embodiments of the present disclosure may acquire an image from various input devices. For example, the table structure generation apparatus 100 may acquire a document image from a device for recognizing characters, pictures, lines, tables, and the like, or a device including a camera, a scanner, an optical reader, or the like. In addition, the table structure generation apparatus 100 may acquire a document image from an external server or an external device through wired or wireless communication.

The crossing models according to various embodiments of the present disclosure are models identified based on crossing shapes and may include crossing models such that each crossing model has at least two direction components from among up, down, left, and right direction components, or a crossing model having no direction components. The crossing models according to an embodiment of the present disclosure will be described below in detail with reference to FIGS. 8A and 8B.

The table structure generation apparatus 100 according to various embodiments of the present disclosure may include a function determination unit 110, a cell generation unit 120, and a table storage unit 130. The components of the table structure generation apparatus 100 including the function determination unit 110, the cell generation unit 120, and the table storage unit 130 may be controlled by a Central Processing Unit (CPU) provided in the table structure generation apparatus 100, a linked external control device, or the like.

The function determination unit 110 according to various embodiments of the present disclosure may extract lines forming a table from among connection components forming an image, and determine functions matched with the lines.

The connection component according to various embodiments of the present disclosure may include a set of lines in which two arbitrary points are connectable via at least one path.

The cell generation unit 120 according to various embodiments of the present disclosure may determine line intersections by using crossing functions. The cell generation unit 120 may determine one of a plurality of pre-stored crossing models identified based on crossing shapes, in correspondence with each of the line intersections. The cell generation unit 120 may generate data describing a table including at least one cell by using a determined crossing model.

The table storage unit 130 according to various embodiments of the present disclosure may store the generated data describing the table. The table storage unit 130 may store the plurality of crossing models identified based on crossing shapes of the lines. In addition, the table structure generation apparatus 100 may store data required to generate a structure of a table from an image.

A method by which the table structure generation apparatus 100 according to various embodiments of the present disclosure generates a structure of a table included in an image will now be described with reference to FIG. 2.

In operation S210, the function determination unit 110 extracts lines forming the table from among connection components forming the image. For example, the function determination unit 110 may extract the connection components forming the image by binarizing the image and extracting the lines forming the table from among the connection components. As another example, the function determination unit 110 may determine boundary components of the image, which may be identified based on a color, extract the connection components by using the boundary components, and extract the lines forming the table from among the connection components. As another example, the function determination unit 110 may approximate each of the connection components included in the image with respect to an oval, determine at least one component of characters and pictures in the image on the basis of at least one of the size of the oval, an eccentricity, and a pixel density of the connection component in the oval, and extract the lines forming the table by removing the determined at least one component of the characters and the pictures from the image.

In operation S220, the function determination unit 110 determines line intersections by using crossing functions matched with the lines. For example, the function determination unit 110 may perform a minimizing operation of adjusting the width of each of the lines forming the table to one pixel size of the image and determine the line intersections by using crossing functions matched with the adjusted lines.

In operation S230, the cell generation unit 120 determines one of a plurality of crossing models identified based on crossing shapes, in correspondence with each of the line intersections. For example, the cell generation unit 120 may determine a crossing model corresponding to each of the line intersections, based on the possibility of coexistence of crossing models determined for mutually neighboring crossings. For example, the cell generation unit 120 may use a Markov random field (MRF) model having a restriction condition of the possibility of coexistence with a random variable of a crossing model to determine one crossing model for which an energy value of an energy function induced from the MRF model is minimized as a crossing model corresponding to a crossing of lines.

In operation S240, the cell generation unit 120 generates data describing the table, which includes at least one cell determined by using the determined crossing model. The table storage unit 130 may store the generated data describing the table.

Figure 3:
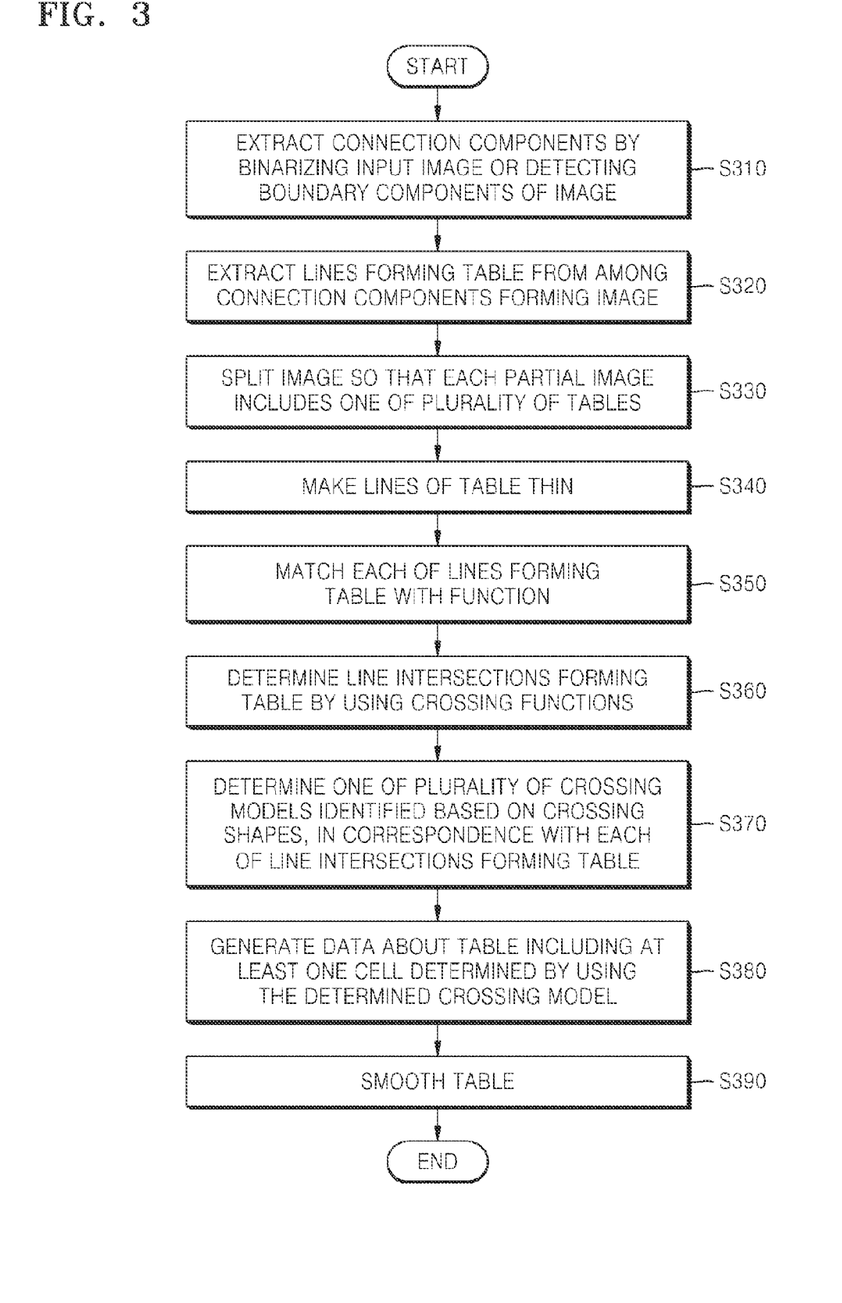
FIG. 3 is a flowchart of a table structure generation method according to an embodiment of the present disclosure.

FIG. 3 is a flowchart of a table structure generation method according to an embodiment of the present disclosure.

In operation S310, the function determination unit 110 extracts connection components by binarizing an input image or detecting boundary components of the image.

Each of the connection components may include a set of lines in which two arbitrary points are connectable via at least one path. The connection components may be extracted by binarizing the image or by determining the boundary components of the image from boundaries of regions represented by colors, contrast, or the like.

In operation S320, the function determination unit 110 extracts lines forming a table from among the connection components forming the image. For example, the function determination unit 110 may approximate each of the connection components included in the image with respect to an oval, determine character components of the image on the basis of at least one of the size of the oval, an eccentricity, and a pixel density of connection components in the oval, and extract the lines forming the table by removing the determined character components.

When the image includes a plurality of tables, the function determination unit 110 splits the image so that each partial image includes one of the plurality of tables, in operation S330. For example, the function determination unit 110 may extract one table by selecting at least one point from among points forming the tables in the image and reflexively connecting a point having the minimum distance from the selected point. In addition, the function determination unit 110 may split the document image into at least one partial image so that an independently extracted table is included in one partial image. Alternatively, the function determination unit 110 may use a dynamic programming method to extract one table.

In operation S340, the function determination unit 110 performs a minimizing operation of adjusting the width of each of the lines forming the table to one pixel size of the image. In general, connection components included in an image recognized by an imaging sensor have the high possibility of having a wide width. Therefore, the function determination unit 110 may minimize the widths of the lines forming the table such that they are thin before the lines forming the table are matched with functions.

In operation S350, the function determination unit 110 matches each of the minimized lines with a function. For example, each lengthwise line of the lines forming the table may be matched with a straight line function.

In operation S360, the cell generation unit 120 calculates crossing of the functions determined in operation S350 and determines the calculated crossings as line intersections forming the table.

In operation S370, the cell generation unit 120 determines one of a plurality of crossing models identified based on crossing shapes, in correspondence with each of the line intersections forming the table, which are determined in operation S360.

For example, the plurality of crossing models may include 11 crossing models, each having at least two direction components from among up, down, left, and right direction components, and one crossing model having no direction components.

In operation S380, the cell generation unit 120 generates data describing the table including at least one cell by using the determined crossing model. When neighboring crossing models may form a rectangle based on shapes of the crossing models, the cell generation unit 120 may determine an internal region of crossings corresponding to the rectangle as one cell.

In operation S390, the cell generation unit 120 smoothes the table by using the cell determined in operation S380. For example, the cell generation unit 120 may smooth the table by using a boundary interpolation method.

In addition, the cell generation unit 120 may store the generated data describing the table in the table storage unit 130.

Figure 4:
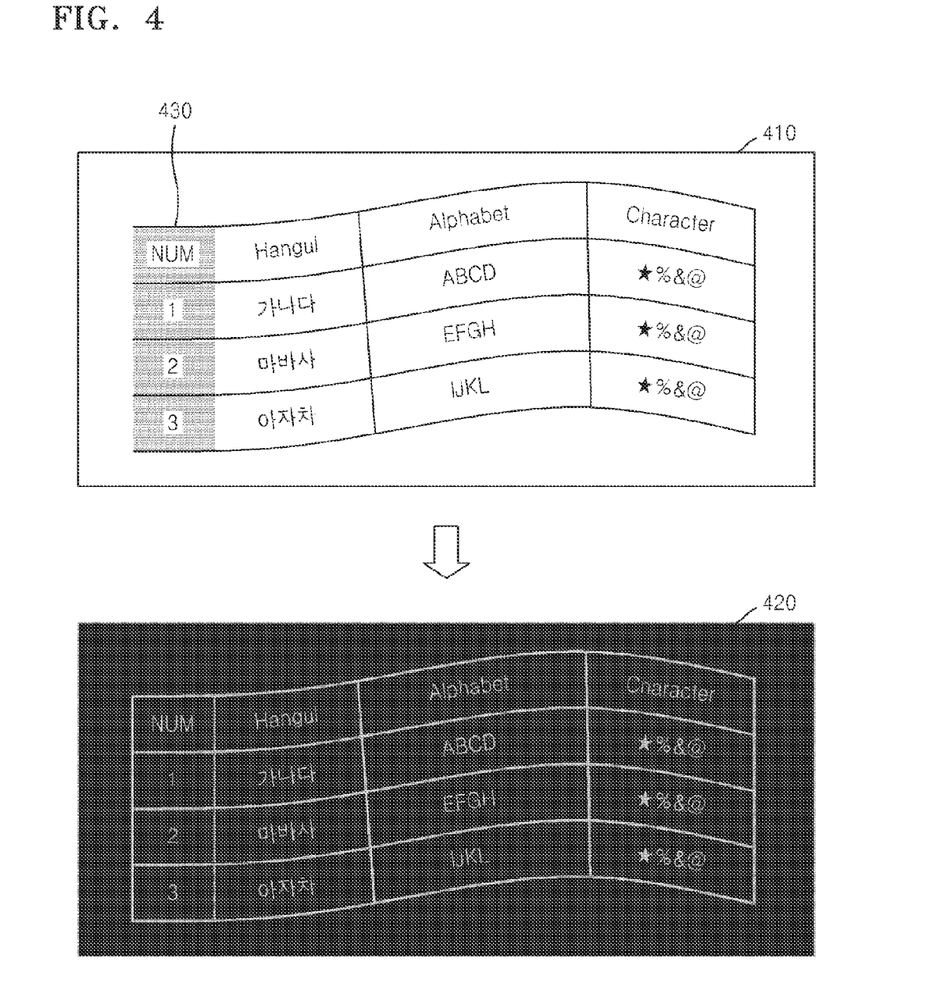
FIG. 4 illustrates a method of extracting connection components from a recognized image according to an embodiment of the present disclosure.

FIG. 4 illustrates a method of extracting connection components from a recognized image according to an embodiment of the present disclosure.

A connection component according to an embodiment of the present disclosure may include a set of lines in which two arbitrary points are connectable via at least one path, as described above. In other words, if two arbitrary points are connectable via at least one path from among a certain set of lines, the set of lines may be one connection component. Therefore, each letter, each number, or each symbol may be one connection component, and total lines forming a table may be one connection component.

As shown in FIG. 4, a state where connection components of a document image 410 including a table formed with lines indicating boundaries, except for lengthwise lines of a leftmost column 430, are extracted is shown. For the leftmost column 430, boundaries of the table are identified by a color or contrast.

An image 420, in which connection components are extracted, may be an image in which connection components including a character, a picture, a table, and the like are extracted by applying a binarizing or boundary component detection method to the document image 410.

The table structure generation apparatus 100 may recognize a character, a symbol, or a table included in a document and generate an image, by using an imaging sensor, an optical reader, or the like including a charge-coupled device (CCD), a complementary metal oxide semiconductor field effect transistor (CMOSFET), or the like.

The image generated by the imaging sensor, the optical reader, or the like may include much noise. The function determination unit 110 may extract connection components by applying binarization for changing data of an input image to 0 or 1 based on a preset reference value. Alternatively, the function determination unit 110 may extract connection components by applying a boundary component detection method for detecting a portion of which a color, density, or the like rapidly changes from data of an image. A boundary component of an image may include a boundary of a region identified by a color, contrast, or the like.

The function determination unit 110 may apply both the binarization and the boundary component detection methods. Alternatively, the function determination unit 110 may apply only one of the binarization and the boundary component detection methods according to a selection of a user.

Figure 5:
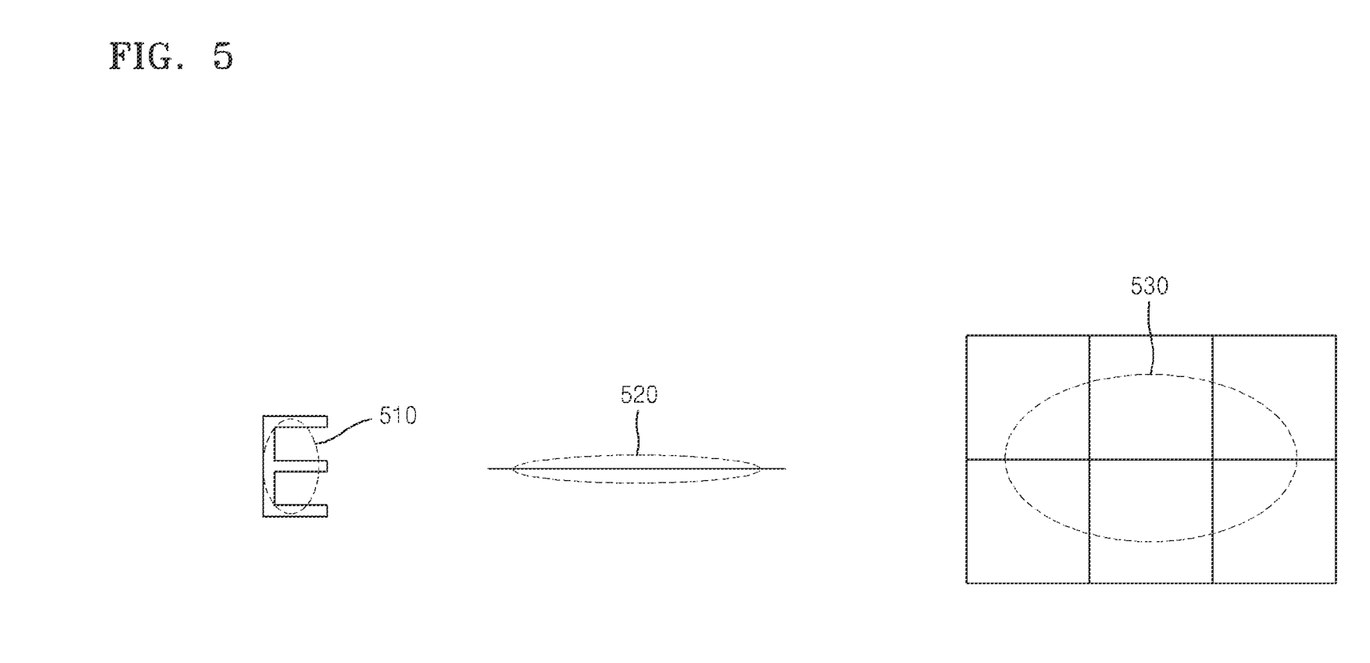
FIG. 5 illustrates a connection component filtering method for extracting lines forming a table according to an embodiment of the present disclosure.

FIG. 5 illustrates a connection component filtering method for extracting lines forming a table according to an embodiment of the present disclosure.

Connection component filtering is a method of extracting only desired connection components from among connection components existing in an image. As described above, the connection components may include a character, a picture, a table, and the like.

In general, a table is formed with thin and long lines, compared with a character or a symbol. When a character, a symbol, a line, or a table is approximated with respect to an oval, the line may be discriminated from the other connection components, based on a difference in an eccentricity, which is a length ratio of a long axis of the approximated oval to a short axis thereof, and a size of the oval.

As a result, an oval 510 obtained by approximating a character or a symbol has a small size and a low eccentricity, and a density of connection components in the oval 510 is high. In addition, an oval 520 obtained by approximating a line with respect to the oval 520 has a high eccentricity and has a low density of a connection component in the oval 520. In addition, an oval 530 obtained by approximating a table with respect to the oval 530 has a large size and has a low density of connection components in the oval 530.

By using the above-described differences, the function determination unit 110 may identify and determine a character, a symbol, or a table and extract only lines forming the table by removing character and symbol components from among connection components of an image.

Figure 6A:
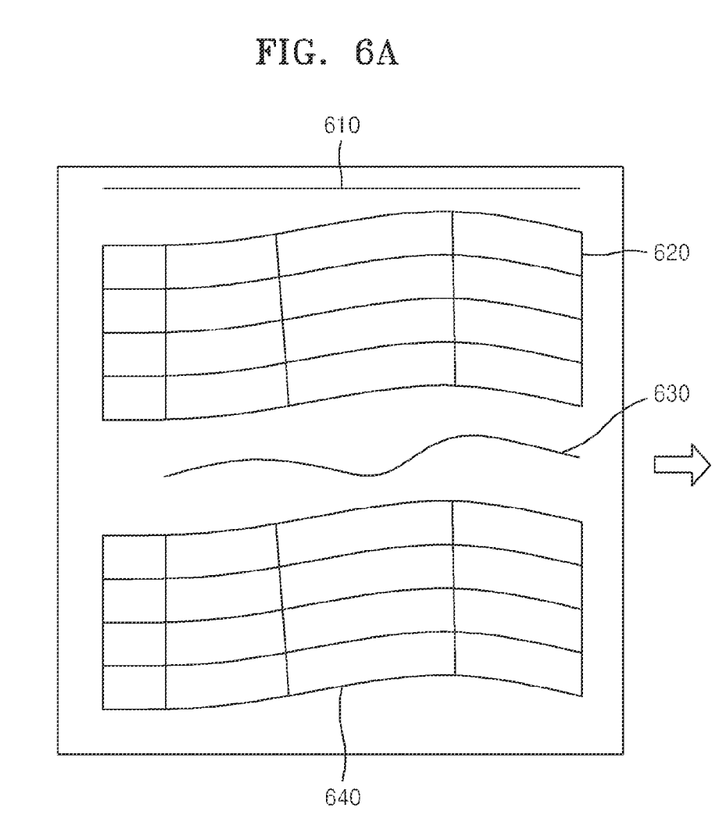
FIG. 6A and FIG. 6B illustrate splitting an image including a plurality of tables so that one partial image includes one table according to an embodiment of the present disclosure.
Figure 6B:
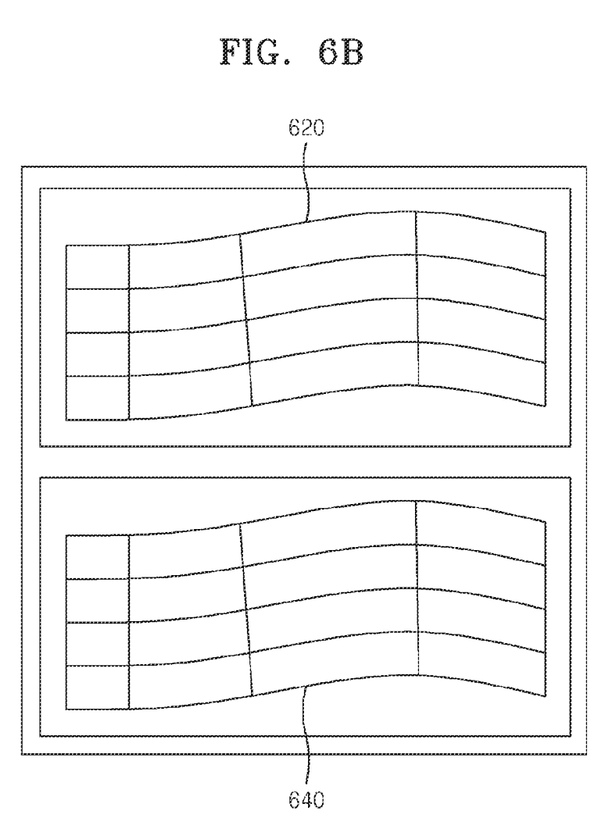

FIG. 6A and FIG. 6B illustrate splitting an image including a plurality of tables so that one partial image includes one table according to an embodiment of the present disclosure.

FIG. 6A illustrates an image includes two tables. FIG. 6B illustrates partial images split from the image illustrated in FIG. 6A so that one partial image includes one table.

When an image includes a plurality of tables, the function determination unit 110 may split the image so that each partial image includes one of the plurality of tables.

For example, the function determination unit 110 may split an image by using a minimum distance measurement method. In detail, the function determination unit 110 may split an image by reflexively connecting a point having the minimum distance from a point forming one table in the image to extract the table.

For example, when a process of starting from an arbitrary point, selecting and connecting to a point having the minimum distance from the starting point, and selecting and connecting to a point having the minimum distance from the selected point is continued, one table may be detected. Therefore, the function determination unit 110 may separate connection components 620 and 640 indicating tables from among connection components 610, 620, 630, and 640 by applying the minimum distance measurement method to the image illustrated in FIG. 6A.

In this case, the function determination unit 110 may use a dynamic programming method for a repetitive operation of reflexively connecting a point having the minimum distance from another point. The dynamic programming method is a programming methodology used to solve a problem in which the entire object includes a repetitive form of a portion. For example, the function determination unit 110 may store a point or path, which has been selected and connected even once, in the table storage unit 130 and extract one connection component by using a stored connection relationship when the same point or path is selected. Therefore, the function determination unit 110 may relatively quickly extract a connection component without repeating the same operation.

Figure 7:
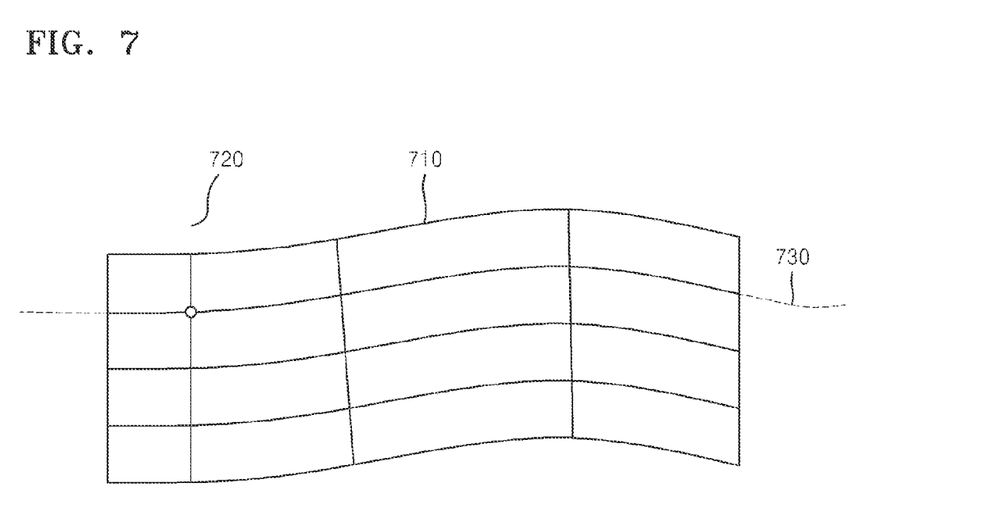
FIG. 7 illustrates a curve matching method for matching a function with each of lines forming a table according to an embodiment of the present disclosure.

FIG. 7 illustrates a curve matching method for matching a function with each of the lines forming a table according to an embodiment of the present disclosure.

The function determination unit 110 may determine a function matched with a crosswise line or a lengthwise line forming a table 710 in order to find out crossings of lines forming the table 710. For example, the function determination unit 110 may model a function matched with a specific line, based on coordinates of points included in the specific line forming the table 710. Since lines forming a table included in an image may be curves, each lengthwise or crosswise line may be matched with a high-order polynomial function.

However, in general, when a table recognized by an imaging sensor has a cylindrical surface or is displayed on a flat surface, such as an unfolded book, lengthwise lines may be straight lines. Therefore, the function determination unit 110 may reduce the amount of computations by matching the lengthwise lines with a one-order polynomial function. Therefore, the function determination unit 110 may determine a polynomial function 730 matched with a crosswise line and determine a straight line function 720 matched with a lengthwise line.

The cell generation unit 120 may determine crossings of lines forming a table by using functions.

Figure 8A:
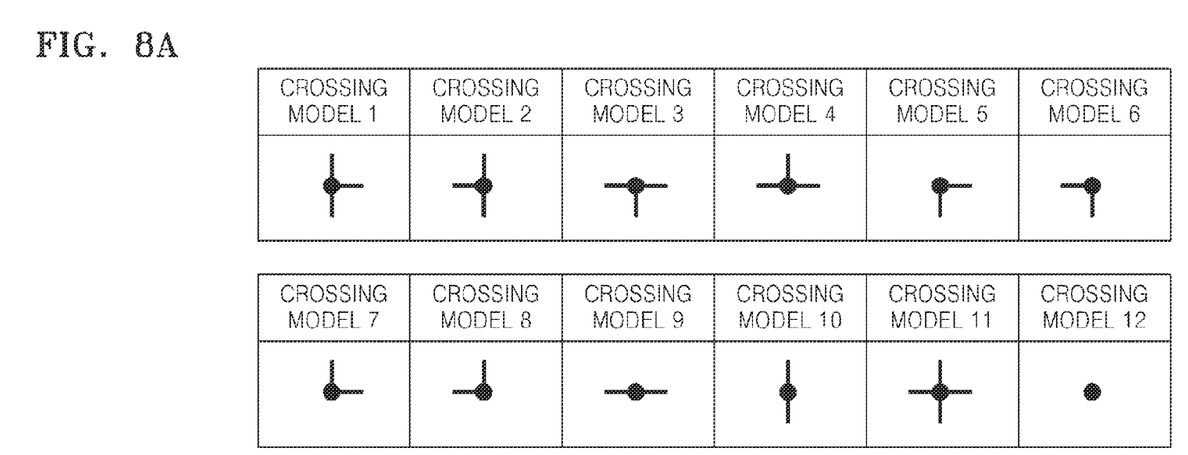
FIG. 8A illustrates crossing models identified based on crossing shapes of lines forming a table according to an embodiment of the present disclosure.
Figure 8B:
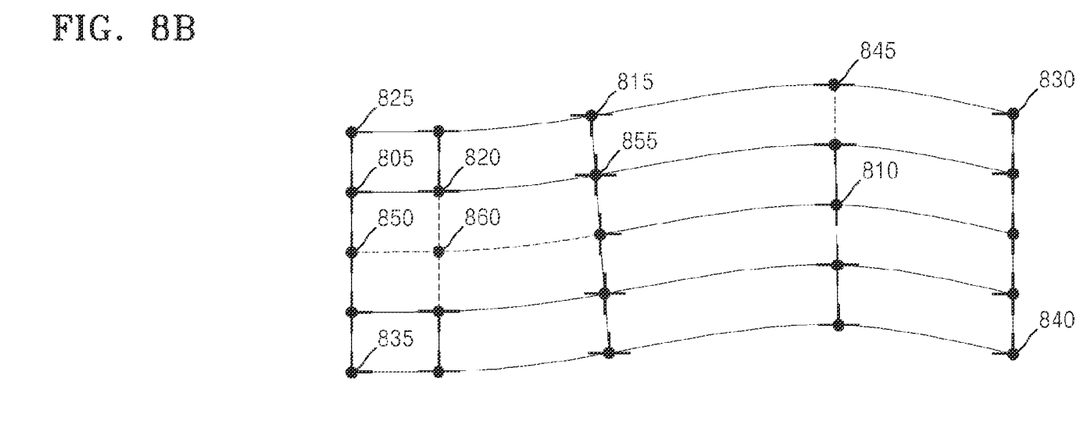
FIG. 8B illustrates a method of determining crossing models for crossings of lines forming a table according to an embodiment of the present disclosure.
Figure 8C:
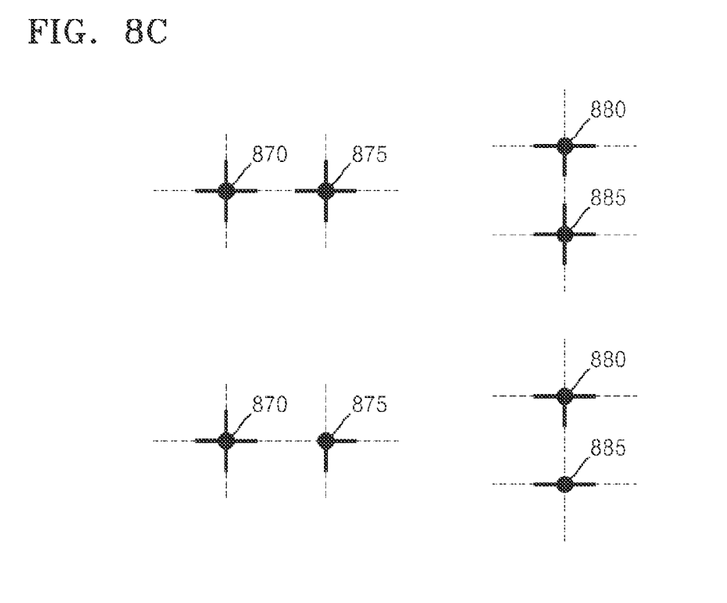
FIG. 8C illustrates inconsistent conditions between neighboring crossing models according to an embodiment of the present disclosure.

FIG. 8A illustrates crossing models identified based on crossing shapes of lines according to an embodiment of the present disclosure. FIG. 8B illustrates a method of determining crossing models for crossings of lines according to an embodiment of the present disclosure. FIG. 8C illustrates inconsistent conditions between neighboring crossing models according to an embodiment of the present disclosure.

To complete a structure of a table, besides coordinates of crossings of lines forming the table, a structure of a cell inside the table may be further determined. Therefore, the cell generation unit 120 may determine a crossing model corresponding to each crossing and determine a structure of cells by using the determined crossing model.

As shown in FIG. 8A, the crossing models exhibit shapes which crossings may have. The crossing models may include 11 models, each having at least two direction components from among up, down, left, and right direction components, and one model having no direction components.

For example, from among the crossings forming the table shown in FIG. 8B, a crossing model 1 may be determined for a crossing 805 having up, right, and left direction components. In addition, a crossing model 2 may be determined for a crossing 810 having up, left, and down direction components. In addition, a crossing model 3 may be determined for a crossing 815 having left, down, and right direction components. In addition, a crossing model 4 may be determined for a crossing 820 having left, up, and right direction components. In addition, a crossing model 5 may be determined for a crossing 825 having right and down direction components. In addition, a crossing model 6 may be determined for a crossing 830 having left and down direction components. In addition, a crossing model 7 may be determined for a crossing 835 having up and right direction components. In addition, a crossing model 8 may be determined for a crossing 840 having left and up direction components. In addition, a crossing model 9 may be determined for a crossing 845 having left and right direction components. In addition, a crossing model 10 may be determined for a crossing 850 having up and down direction components. In addition, a crossing model 11 may be determined for a crossing 855 having left, up, right, and down direction components. In addition, a crossing model 12 may be determined for a crossing 860 having no direction components.

The cell generation unit 120 may use a restriction condition when a crossing model corresponding to each crossing is determined.

As shown in FIG. 8C, there are crossing models which cannot coexist between neighboring crossings. For example, when the crossing model 11 was determined for a crossing 870, for a crossing 875 neighboring to the right of the crossing 870, the crossing model 11 may be accepted, but the crossing model 5 cannot be accepted since the crossing model 5 does not have the right direction component. In addition, when the crossing model 3 was determined for a crossing 880, for a crossing 885 neighboring to the bottom of the crossing 880, the crossing model 11 may be accepted, but the crossing model 9 cannot be accepted since the crossing model 9 does not have the up direction component.

In addition, the cell generation unit 120 may use an energy function based on an MRF model to determine a crossing model corresponding to each crossing.

The MRF model is a graphic model of joint probability distribution and may model a case where a probability that an event occurs in an arbitrary node is influenced by only neighboring nodes in a predetermined graph having no directivity. In addition, in the MRF model, a probability that an event occurs in an arbitrary node when an event occurs in a neighboring node may be determined by a function having a specific energy function as a minus exponent of an exponential function. Therefore, when an event occurs in a neighboring node, an event having the highest probability that the event occurs in an arbitrary node has the minimum energy function value corresponding thereto. In addition, the specific energy function may be determined by a data term considering only a node itself and by a pairwise term considering a restriction condition between nodes.

Since the restriction condition between crossings forming a table is a condition between neighboring crossings, a problem of selecting a crossing model corresponding to an arbitrary crossing when a crossing model of a neighboring crossing was determined may be a conditional probability problem. Therefore, the MRF model may be applied to the problem of selecting a crossing model corresponding to an arbitrary crossing. Accordingly, according to the MRF model, a crossing model determined for an arbitrary crossing is a crossing model having the lowest result value of the energy function.

The energy function based on the MRF model, according to an embodiment of the present disclosure, may include a data term considering only a crossing itself and a pairwise term considering a restriction condition between crossings. The data term may be acquired by observing n pixels in up, down, left, and right directions at an arbitrary crossing, and the pairwise term may be acquired from a restriction condition between neighboring crossings.

For example, when n pixels in up, down, left, and right directions at coordinates of an arbitrary crossing are observed, if more pixels are observed in the left and up directions, a low energy value is obtained when the crossing model 8 having the left and up direction components is used for the arbitrary crossing. In addition, when a restriction condition between neighboring crossings occurs, an energy value of the pairwise term may be determined as infinity.

According to the MRF model described above, the cell generation unit 120 may quickly and accurately determine crossing models corresponding to crossings by selecting a crossing model having the lowest energy function value for each of the crossings.

Figure 9:
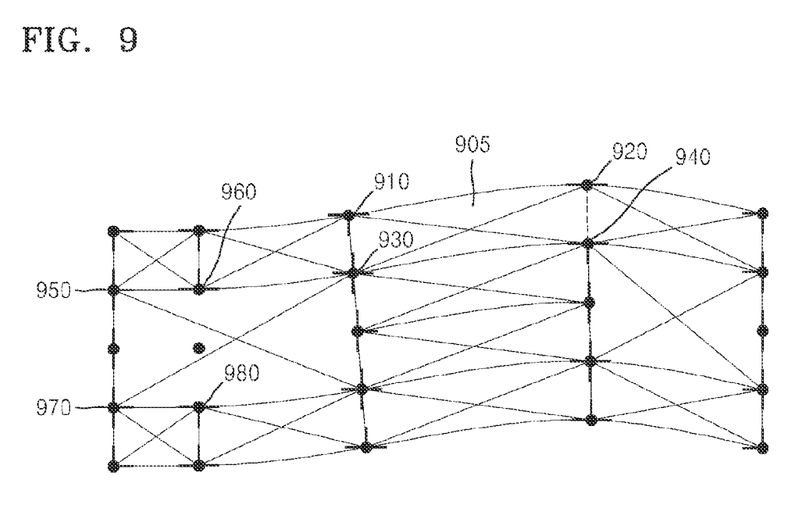
FIG. 9 illustrates a method of forming a cell by using crossing models according to an embodiment of the present disclosure.

FIG. 9 illustrates a method of forming a cell by using crossing models according to an embodiment of the present disclosure.

As shown in FIG. 9, the cell generation unit 120 may generate a cell by using a crossing model corresponding to each crossing. For example, when a rectangle is formed among neighboring crossing models based on shapes of crossing models, the cell generation unit 120 may determine an internal region of crossings corresponding to the rectangle as one cell.

For example, since crossing models determined for crossings 910, 920, 930, and 940 have direction components (right down, down left, right up, and left up, respectively) required to form a rectangle, respectively, one cell 905 may be formed therefrom. However, from among crossing models determined for crossings 950, 960, 970, and 980, a crossing model for the crossing 960 does not have the down direction component and a crossing model for the crossing 980 does not have the up direction component, and thus one cell cannot be formed therefrom. Therefore, the crossings 950, 960, 970, and 980 cannot form one cell.

Figure 10:
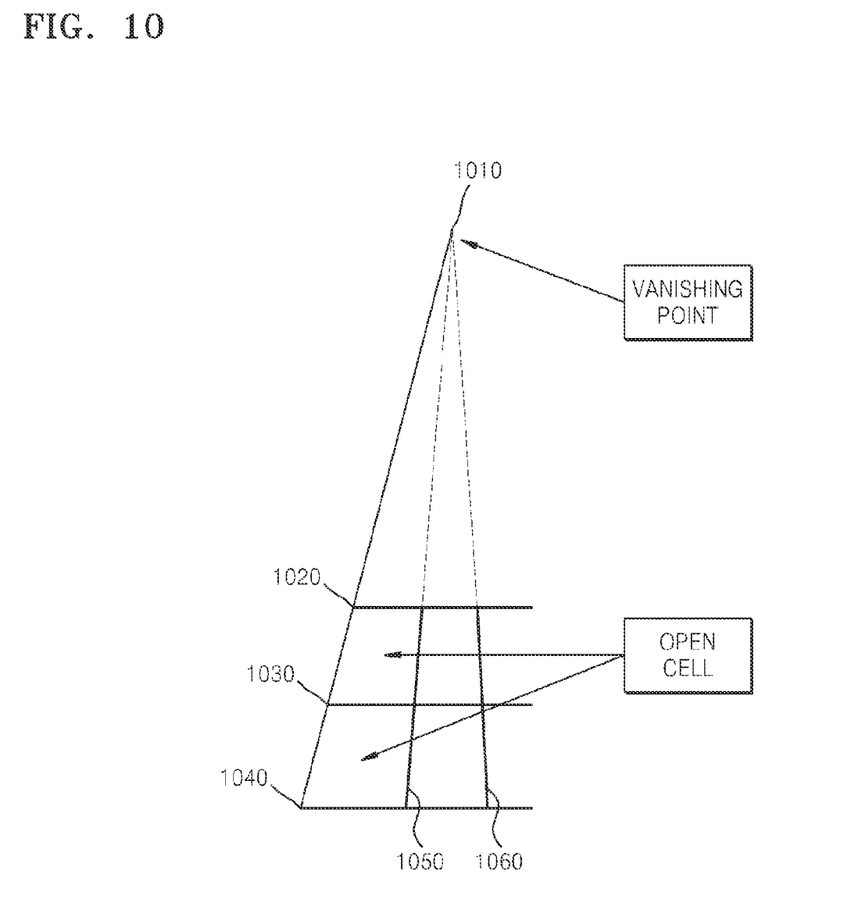
FIG. 10 illustrates a method of forming an open cell according to an embodiment of the present disclosure.

FIG. 10 illustrates a method of forming an open cell according to an embodiment of the present disclosure.

When the leftmost or rightmost lengthwise line does not exist in an image, the cell generation unit 120 may form open cells by connecting end points 1020, 1030, and 1040 of crosswise lines existing in an open direction.

In general, since a surface of a document is a cylindrical surface or a flat surface, such as an unfolded book, there is a high possibility that lengthwise lines of a table in an actual document are maintained parallel. By using this, open cells may be formed by calculating a vanishing point of lengthwise lines and using the calculated vanishing point.

For example, the cell generation unit 120 may form open cells by determining the longest line from among the crosswise lines existing in the open direction and connecting the end point of the longest line to a vanishing point of the lengthwise lines.

As shown in FIG. 10, open cells opening in the left direction may be formed by connecting the end point 1040 of the longest crosswise line among the end points 1020, 1030, and 1040 of the crosswise lines to a vanishing point 1010. The vanishing point 1010 is a point where existing lengthwise lines 1050 and 1060 meet.

The cell generation unit 120 may smooth a table by smoothing each generated cell. For example, cell generation unit 120 may smooth the table by using up, down, left, and right functions surrounding a cell to apply a boundary interpolation method to the outer frame of the cell.

One embodiment of the present disclosure may be implemented by a recording medium including instructions executable by a computer, such as a program module to be executed by a computer. A computer-readable recording medium may be an arbitrary available medium which may be accessed by a computer and includes both volatile and non-volatile media and both separable and non-separable media. In addition, the computer-readable recording medium may be both a computer storage medium and a communication medium. The computer storage medium includes computer-readable instructions, data structures, program modules, and other volatile and non-volatile and separable and non-separable media implemented by arbitrary methods or techniques for storing information such as data. The communication medium typically includes computer-readable instructions, data structures, program modules, and other data of modulated data signals, such as carrier waves, other transmission mechanisms, and arbitrary information transfer media.

While embodiments of the present disclosure have been described with reference to the accompanying drawings, it will be understood by those of ordinary skill in the art that various changes in form and details may be made therein without changing the technical spirit and mandatory features of the present disclosure. Therefore, the embodiments should be understood in the illustrative sense only and not for the purpose of limitation in all aspects. For example, each component described in a single form may be carried out in a distributed fashion, and likewise, components described in a distributed form may be carried out in a combined fashion.

In addition, other embodiments of the present disclosure can also be implemented through computer-readable code/instructions in/on a medium, e.g., a computer-readable medium, to control at least one processing element to implement any above-described embodiment. The medium can correspond to any medium/media permitting the storage and/or transmission of the computer-readable code.

The computer-readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to various embodiments of the present disclosure. The media may also be a distributed network, so that the computer-readable code is stored/transferred and executed in a distributed fashion. Furthermore, the processing element could include a processor or a computer processor, and processing elements may be distributed and/or included in a single device.

It should be understood that the various embodiments described therein should be considered in a descriptive sense only and not for purposes of limitation. Descriptions of features or aspects within each embodiment should typically be considered as available for other similar features or aspects in other embodiments.

While the present disclosure has been described with reference to various embodiments thereof, it will be understood by those skilled in the art that various changes in form and details may be made therein without departing from the spirit and scope of the present disclosure as defined by the appended claims and their equivalents.

What is claimed is:

1. A method of recognizing and generating a structure of a table included in an image, the method comprising:
    extracting a plurality of lines forming the table from among a plurality of connection components forming the image;
    determining a plurality of line intersections by using a plurality of crossing functions each corresponding to one of the plurality of lines;
    determining one of a plurality of crossing models identified based on a plurality of crossing shapes, in correspondence with each of the plurality of line intersections; and
    generating data describing the table, which includes at least one cell determined using the determined crossing model.

2. The method of claim 1, further comprising:
    smoothing the at least one cell; and
    smoothing the table by using the smoothed at least one cell.

3. The method of claim 1, wherein the plurality of crossing models comprise a plurality of crossing models, each having at least two direction components including up, down, left, and right direction components, and one crossing model having no direction components.

4. The method of claim 1, wherein the extracting of the plurality of lines comprises:
    determining boundary components of the image identified by a color;
    extracting the plurality of connection components by using the boundary components; and
    extracting the plurality of lines forming the table from among the plurality of connection components.

5. The method of claim 1, wherein the extracting of the plurality of lines comprises:
    approximating each of the plurality of connection components included in the image with respect to an oval;
    determining at least one component of characters or pictures in the image on the basis of at least one of a size of the oval, an eccentricity of the oval, and a pixel density of the connection component in the oval; and
    extracting the plurality of lines forming the table by removing the determined at least one component of the characters or the pictures from the image.

6. The method of claim 1, wherein the image includes a plurality of tables, and
    the determining of the plurality of line intersections comprises:
    splitting the image so that each partial image includes one of the plurality of tables; and
    determining the plurality of line intersections by using a crossing function corresponding to each of a plurality of line intersections forming the tables included in the split images.

7. The method of claim 6, wherein the splitting comprises extracting one table by reflexively connecting a point having the minimum distance from a point forming the tables included in the image.

8. The method of claim 1, wherein the determining of the plurality of line intersections comprises:
    performing a minimizing operation of adjusting the width of each of the plurality of lines forming the table to one pixel size of the image.

9. The method of claim 1, wherein lengthwise lines among the plurality of lines forming the table are matched with a straight line function.

10. The method of claim 1, wherein the determining of the one of the plurality of crossing models comprises determining a crossing model corresponding to a line intersection, based on the coexistence possibility of crossing models determined for neighboring crossings.

11. The method of claim 10, wherein the determining of the one of the plurality of crossing models comprises using a Markov random field (MRF) model having a restriction condition of the coexistence possibility with a random variable of a crossing model to determine one crossing model for which an energy value of an energy function induced from the MRF model is minimized as a crossing model corresponding to a line intersection.

12. A non-transitory computer-readable storage medium having stored therein program instructions, which when executed by a computer, perform the method of claim 1.

13. An apparatus for recognizing and generating a structure of a table included in an image, the apparatus comprising:
a function determination unit configured to extract a plurality of lines forming the table from among a plurality of connection components forming the image and determining a plurality of crossing functions each corresponding to one of the plurality of lines;
a cell generation unit configured to determine a plurality of line intersections by using the plurality of crossing functions, to determine one of a plurality of pre-stored crossing models identified based on the plurality of crossing shapes, and to generate data describing the table, which includes at least one cell determined using the determined crossing model; and
a table storage unit configured to store the plurality of crossing shapes.

14. The apparatus of claim 13, wherein the cell generation unit is configured to smooth the at least one cell and smoothes the table by using the smoothed at least one cell.

15. The apparatus of claim 13, wherein the plurality of crossing models comprise a plurality of crossing models, each having at least two direction components including up, down, left, and right direction components, and one crossing model having no direction components.

16. The apparatus of claim 13, wherein the function determination unit is configured to approximate each of the plurality of connection components included in the image with respect to an oval, to determine at least one component of characters or pictures in the image on the basis of at least one selected from the size of the oval, an eccentricity of the oval, and a pixel density of the connection component in the oval, and extracts the plurality of lines forming the table by removing the determined at least one component of the characters and the pictures from the image.

17. The apparatus of claim 13, wherein the image includes a plurality of tables, and
wherein the function determination unit is configured to split the image so that each partial image includes one of the plurality of tables and determines the plurality of line intersections by using a plurality of crossing functions corresponding to each of a plurality of lines forming the tables included in the split images.

18. The apparatus of claim 17, wherein the function determination unit is configured to extract one table by reflexively connecting a point having the minimum distance from a point forming the tables included in the image.

19. The apparatus of claim 13, wherein the cell generation unit is configured to determine a crossing model corresponding to a line intersection, based on the coexistence possibility of crossing models determined for neighboring crossings.

20. The apparatus of claim 19, wherein the cell generation unit is configured to use a Markov random field (MRF) model having a restriction condition of the coexistence possibility with a random variable of a crossing model to determine one crossing model for which an energy value of an energy function induced from the MRF model is minimized as a crossing model corresponding to a line intersection.

* * * * *